United States Patent [19]

Matsuura et al.

[11] Patent Number: 4,531,284
[45] Date of Patent: Jul. 30, 1985

[54] AUTOMATIC ASSEMBLING MACHINE

[75] Inventors: Tamiaki Matsuura; Takeshi Aiba; Takashi Fukushima; Masanori Nishimura; Hiroshi Ohtsuki, all of Kanagawa; Fujio Yabuki, Saitama; Tomio Kusakabe, Chiba, all of Japan

[73] Assignee: Sony Corporation, Tokyo, Japan

[21] Appl. No.: 647,870

[22] Filed: Sep. 6, 1984

Related U.S. Application Data

[63] Continuation of Ser. No. 390,061, Jun. 18, 1982, abandoned.

[30] Foreign Application Priority Data

Jun. 22, 1981 [JP] Japan ................................. 56-96250

[51] Int. Cl.³ ...................... B23P 21/00; B23P 23/00; B23Q 15/00
[52] U.S. Cl. ....................................... 29/784; 29/564; 29/701
[58] Field of Search ................................. 29/701–703, 29/784, 564, 564.1, 33 K

[56] References Cited

U.S. PATENT DOCUMENTS 2,832,023 4/1958 Gough .................................. 29/702
3,641,651 2/1972 Rockwell et al. ................... 29/701
4,293,998 10/1981 Kawa et al. ........................ 29/564.1

OTHER PUBLICATIONS

Exp. Sys. for Comp. Cont. Mech. Assembly, *IEEE Transactions on Comp.*, vol. C-24, No. 9, pp. 879–888, Sep. 1975, (Will & Grossman).

Primary Examiner—Howard N. Goldberg
Assistant Examiner—Steven Nichols
Attorney, Agent, or Firm—Lewis H. Eslinger; Alvin Sinderbrand

[57] ABSTRACT

An automatic assembling machine is disclosed for use with a carrier having parts arranged on it in predefined positional relationships which are defined by predetermined distances therebetween in two orthogonal directions. A movable table supports the carrier and moves in two orthogonal directions in a horizontal plan. A mounting surface extends above the plane of the movable table and has first and second portions which are parallel to the two orthogonal directions. At least one working unit is attached to at least one of the portions of the mounting surface to cooperate with movements of the table in assembling the parts on the carrier.

7 Claims, 25 Drawing Figures

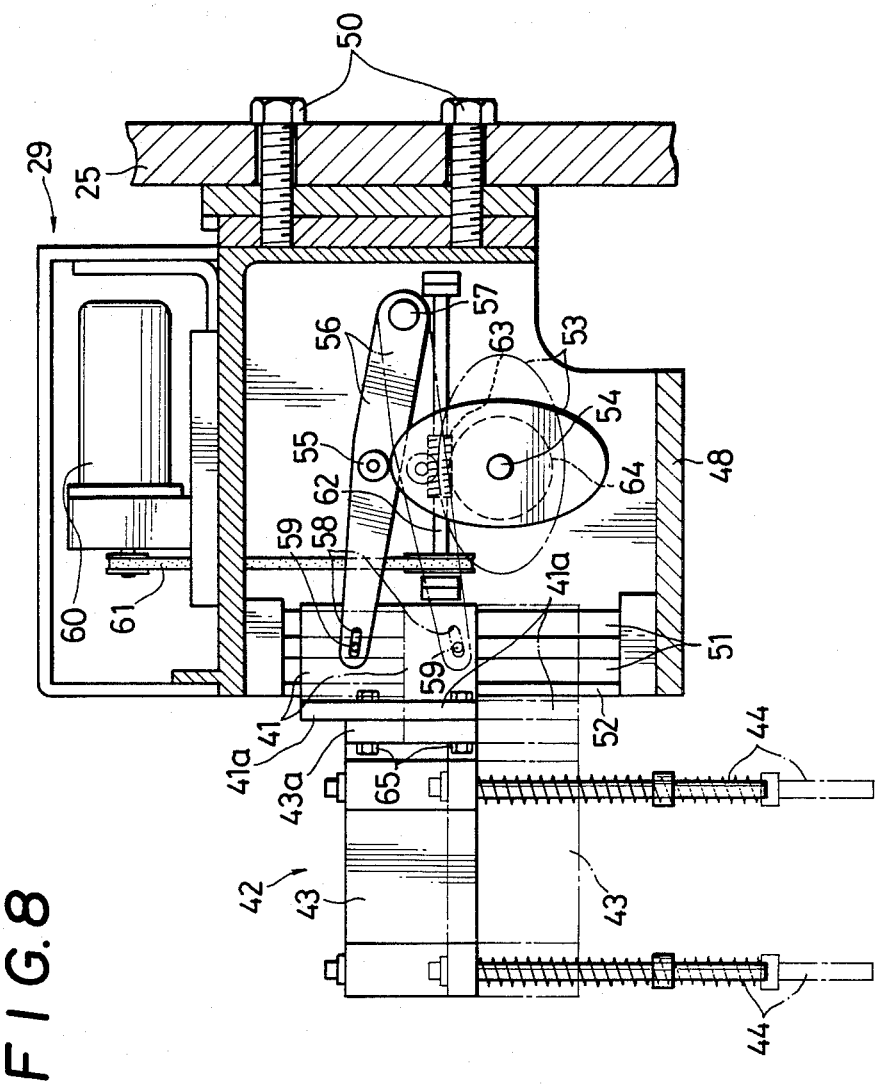

AUTOMATIC ASSEMBLING MACHINE

This is a continuation of application Ser. No. 06/390,061, filed June 18, 1982 now abandoned.

CROSS REFERENCES TO RELATED APPLICATIONS

Reference is made to copending applications Ser. No. 380,997 filed May 21, 1982, now Pat. No. 4,494,298, Ser. No. 387,414 filed June 11, 1982, now Pat. No. 473,935, and Ser. No. 391,472 (June 23, 1982), now Pat. No. 4,476,627, assigned to the assignee of the present application, and containing related subject matter.

BACKGROUND OF THE INVENTION

1. Field of the Invention

The present invention relates to a machine for automatically assembling parts, and more particularly, to a machine for automatically assembling parts positioned on a carrier in a predefined positional relationship.

2. Description of the Prior Art

An automatic assembling machine conventionally assembles parts onto a chassis supported by a carrier. Generally, one unit supplies the parts and another unit, distinct from the parts supplier, supplies the chassis to the carrier. An automatic assembling machine sequentially picks up the parts from the parts supplier and assembles them on the chassis transported by the carrier.

Automatic assembling machines of this type are widely used in manufacturing different kinds of equipment. However, most of these assembling machines are designed and built to assemble only one piece of equipment, and can not be easily changed to accommodate changes in the equipment or changes in the manufacturing process. When a change does occur in the type of equipment to be manufactured or in the manufacturing process, significate changes must be made in the working unit, requiring large expenditures in labor and time.

The positioning of the working units with respect to the direction of movement of the moving table which supports the carrier is another drawback of conventional assembling machines. Generally, the working units are not positioned to cooperate with movements of the moving table in the execution of the sequential assembly steps. The movable table must make a number of movements to position the parts with respect to the working units for the subsequent assembly, increasing the time for assembly and contributing to low efficiency of operation.

OBJECTS AND SUMMARY OF THE INVENTION

Accordingly, it is an object of the present invention to provide an automatic assembling machine which can easily accommodate changes in the equipment to be assembled.

It is another object of the present invention to provide an automatic assembling machine which performs assembly operations with a minimum of unnecessary motion.

It is a further object of the present invention to provide an automatic assembling machine having an assembly center with working units in which the working units can be selectively positioned within the assembly center.

It is still a further object of the present invention to provide an automatic assembling machine having a working unit to which a number of different kinds of working heads can be attached, according to the equipment to be assembled.

In accordance with one aspect of the present invention, an automatic assembling machine is used with a carrier having parts arranged on it in a predefined positional relationship defined by predetermined distances therebetween in two orthogonal directions. The automatic assembling machine has a movable table for supporting the carrier and moving in the two orthogonal directions in a horizontal plane, a mounting surface extending above the horizontal plane of the movable table and having first and second portions parallel to the two orthogonal directions, and at least one working unit attached to at least one of the portions of the mounting surface for cooperation with movements of the table in assembling the parts on the carrier.

In accordance with yet another aspect of the present invention, a carrier with parts placed on predetermined positions are fed to an automatic assembling machine by a conveyer. A movable table supports the carrier and cooperates with a number of working heads positioned in the automatic assembling machine. The working heads are spaced apart from each other by a predetermined distance so as to cooperate with the arrangement of the parts on the carrier. The working heads are mounted to a lift base for vertical reciprocal motion in assembling the parts on the carrier.

The above, and other objects, features and advantages of the invention will be apparent from the following detailed description of an illustrative embodiment thereof which is to be read in connection with the accompanying drawings.

BRIEF DESCRIPTION OF THE DRAWINGS

FIG. 8 is a cross sectional view of a working unit used in the assembly center of FIG. 3;

DETAILED DESCRIPTION OF A PREFERRED EMBODIMENT

Figure 1:
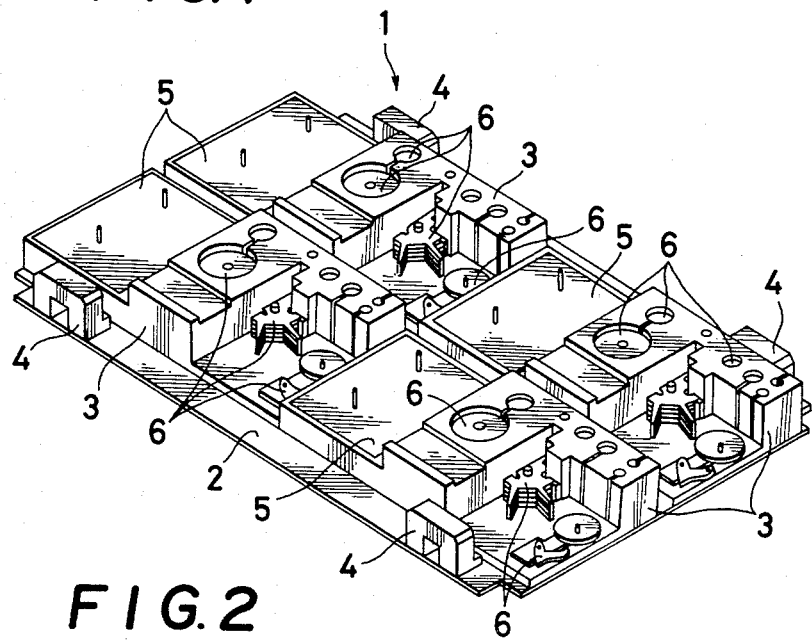
FIG. 1 is a perspective view of a carrier member for use with an automatic assembling apparatus according to the present inventon.

Referring to the drawings in detail, and initially to FIG. 1 thereof, a carrier 1 according to an embodiment of this invention for use in an automatic assembling apparatus is shown to include a base plate 2 with four pallets 3 arranged thereon and fixed in alignment with each other. Suspension handles or keepers 4 are respectively mounted to the four corners of the base plate 2.

Each of the pallets 3 of the carrier 1 has positioned thereon before the assembling operation a chassis 5 and main parts 6 which may be various types of gears, levers, bearings and the like required for assembly on the chassis 5. When the carrier 1 is loaded with the chassis 5 and the main parts 6, it is transferred to an assembly center to be described where an automatic assembling machine sequentially picks-up, feeds, and assembles the main parts 6 onto the chassis 5. At the assembly center, common parts and some other parts, such as reel shafts, screws, and the like are separately fed and assembled onto the chassis 5. In addition to the feeding and assembly of the parts on the chassis 5, other operations such as tightening of the screws, lubrication of parts, magnetization of magnetic members, and other associated operations can be automatically performed at the assembly center. The feeding, processing and assembling of the parts on the chassis 5 are simultaneously performed for the four pallets 3 of the carrier.

Figure 2:
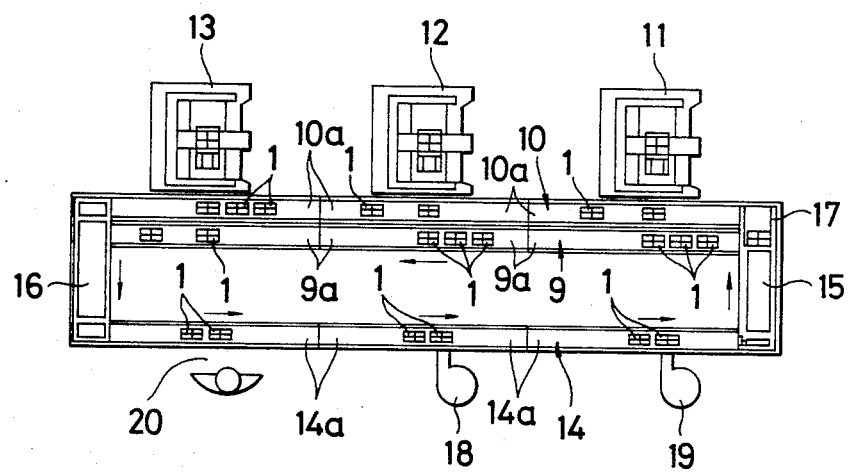
FIG. 2 is a plan view of an automatic assembling apparatus with which carrier members are particularly usable.

An arrangement of conveyers for transporting carriers 1 embodying this invention to and from a number of assembly stations in an automatic assembling apparatus making use of this invention will now be described. In particular, a pair of parallel and adjacent conveyers 9 and 10 are provided to transfer the carriers 1 in the direction of the arrow adjacent to conveyer 9 in FIG. 2. A plurality of assembly centers or stations, for example, three assembly stations 11, 12 and 13 in FIG. 2, are arranged outside of the conveying system adjacent conveyer 10 for performing the feeding, processing and assembling operations with respect to the carriers 1 which are transported by conveyers 9 and 10 to and from the various assembly stations 11, 12 and 13.

In addition, another conveyer 14 is spaced from and parallel to conveyer 9, and a pair of conveyers 15, 16 are provided for connecting the respective ends of the conveyer 14 to the corresponding ends of conveyers 15, 16. In this regard, conveyers 9, 10, 14, 15 and 16 define an endless conveyer line, with carriers 1 being transferred by the endless conveyer line in the direction indicated by the arrows in FIG. 2. The conveyers may be formed by any suitable conveyer system, for example, the conveyers may be comprised of roller conveyers, that is, each conveyer being comprised of a plurality of rotatable rollers over which carriers 1 travel. In this regard, carriers 1 can be stopped at any position along the conveyers by means of appropriate stopping members interposed in their path and can immediately resume their travel upon release of the stopping members. Conveyers 9, 10 and 14 are each divided into a plurality of short conveying sections, 9a 10a and 14a respectively, each conveying section corresponding to a respective one of the assembly stations. In this manner, independent feeding and discharging of carriers 1 with respect to assembly stations 11, 12 and 13 can be easily accomplished.

A distributor 17 is arranged at the front end of the conveyer 15, that is, the end adjacent conveyers 9 and 10, for selectively feeding carriers 1 to either conveyer 9 or conveyer 10, as will be apparent hereinafter. In addition, loading stations 18, 19 are arranged at, for example, two downstream positions of conveyer 14 for supplying carriers 1 to the conveying system, and an unloading station 20 is arranged at the upstream position of conveyer 14 for removing from the conveying system those carriers on which the chassis 5 and respective parts 6 have been assembled together. In this manner, four chassis 5 and associated parts 6 to be assembled thereon are placed on each carrier 1, and the latter are then supplied to the respective loading stations 18, 19 where they are transferred to the conveyer 14. The conveyer 14 then moves the carrier 1 to the conveyer 15, where the distributor 17 selectively feeds the carriers 1 to either the conveyer 9 or the conveyer 10 according to a preset distribution arrangement. The carriers 1 can then be transferred or fed to a first assembly station 11 by the respective conveyer 9 or 10. In particular, the carriers 1 from the conveyer 9 and the conveyer 10 are transferred to the assembly station 11 by a carrier loader thereat and placed on a movable table of assembly station 11, where feeding, processing and assembling operations of the parts 6 on the chassis 5 are automatically performed. Upon completion of the above operations, the carriers 1 are discharged onto one of the conveyers 9, 10 by the carrier loader to be transferred to the next assembly station 12. It is to be appreciated that the carrier loader is movable between a first position in opposing relation to the movable table of assembly station 11 and a second position in opposing relation to the conveyers 9, 10. Feeding and discharge of the carriers 1 with respect to the assembly stations 12, 13 at downstream positions of conveyers 9, 10 are performed in a similar manner. Upon completion of the above operations with respect to the assembly station 13, the carriers are transferred to unloading station 20 by the conveyers 16 and 14 and there unloaded from the conveyer 14, for example, by an operator. The various steps of the operation may be easily varied by switching the feeding and discharge lines of the carriers 1 at the assembly stations 11, 12 and 13 by means of the conveyers 9 and 10.

Figure 3:
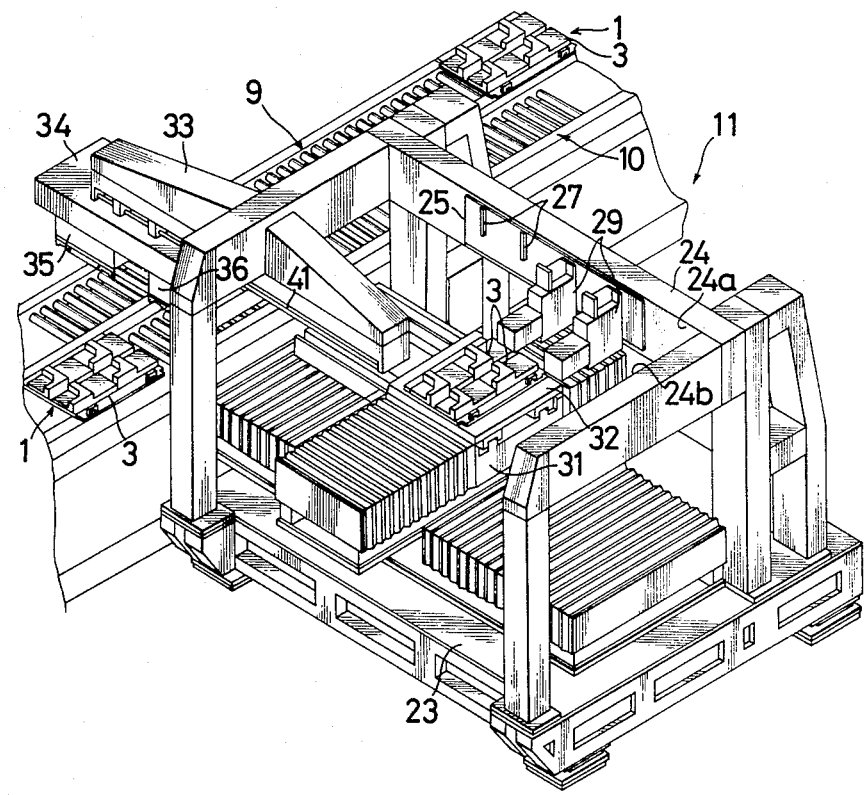
FIG. 3 is a perspective view of an assembly center or station.
Figure 4:
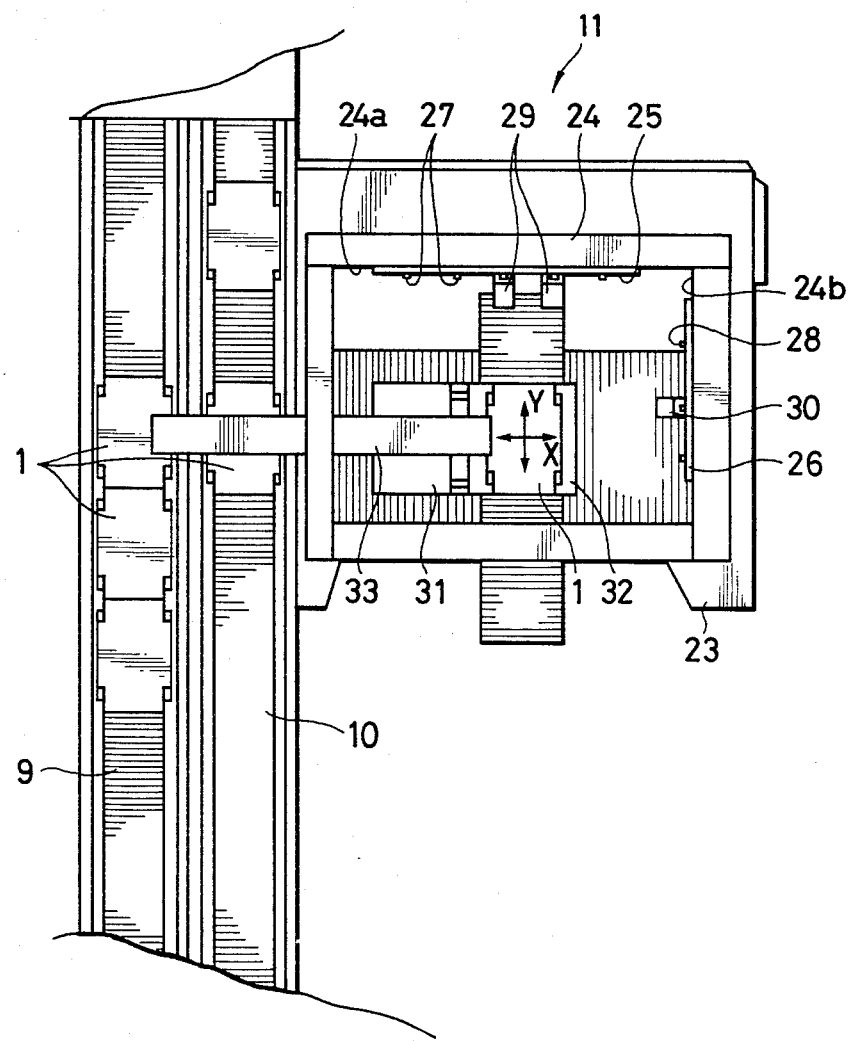
FIG. 4 is a plan view of the assembly center of FIG. 3.
Figure 5:
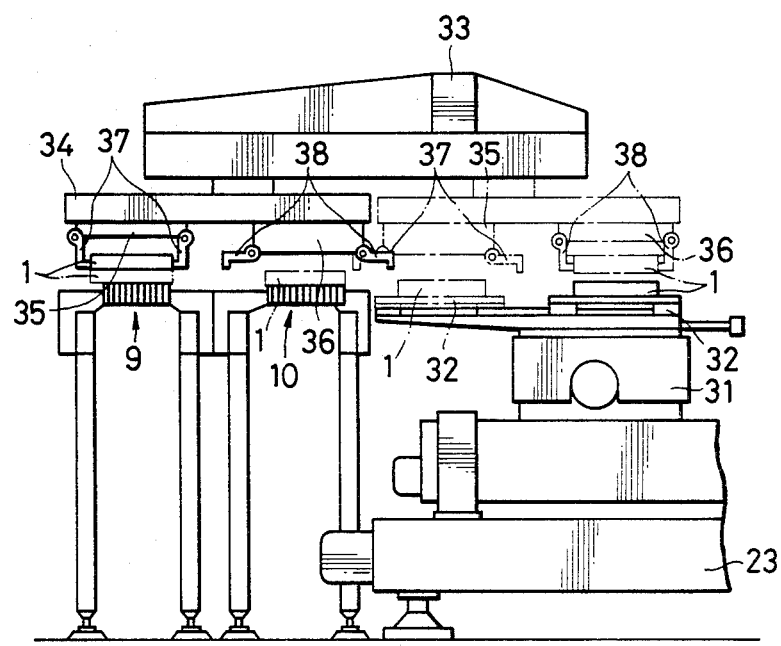
FIG. 5 is an end elevational view of a carrier loader as part of an assembly center of the automatic assembling apparatus of FIG. 2.

Referring now to FIGS. 3, 4 and 5, the construction of the assembly station 11 will now be described. It is to be appreciated, however, that the assembly stations 12 and 13 may also be of the same construction. In particular, the assembly station 11 includes a horizontal, substantially U-shaped mounting member 24 supported by vertical members above a horizontal base 23 and parallel to the latter. The inner side surfaces 24a, 24b of the connecting segment, and a leg, respectively, of U-shaped mounting member 24 have mounting plates 25, and 26, respectively, secured thereto, mounting plates 25 and 26 therefore being perpendicular to each other. A plurality of keys 27 are vertically mounted on the mounting plate 25 and are spaced from each other at predetermined intervals in the direction of the X-axis, that is, the horizontal direction along surface 24a. In a like manner, a plurality of keys 28 are vertically mounted on the mounting plate 26 and are spaced from each other at predetermined intervals in a Y-axis horizontal direction. Working units 29 and 30 are mounted on selected ones of the keys 27 and 28, respectively, and can be easily removed from one key and mounted on another key. The working units include working heads mounted on the lower ends of the working units 29 and 30 which are vertically reciprocable.

A movable table 31 is mounted on base 23 and is adapted to be driven in the X-axis and Y-axis directions in the horizontal plane of the base 23, as shown in FIG. 4, and a shift table 32 is also horizontally reciprocable within a limited range in the X-axis direction on the movable table 31. It is to be appreciated that the feeding, processing and assembling operations with respect to the carrier 1 and the four chassis 5 thereon occur on the shift table 32. It is to be further appreciated, however, that the shift table 32 is provided to minimize the movements of the table 31 and thereby provide a compact machine, but may be eliminated if desired. In that case, all movements of a carrier 1 would be effected by the movements of table 31.

A loader guide 33 is horizontally suspended from the other leg of mounting member 24 and extends in the X-axis direction, and a carrier loader 34 is slidably mounted to the underside of the loader guide 33 for horizontal reciprocable movement in the X-axis direction between a first position in opposing relation to the upper surface of the movable table 31 of the assembly station 11 and a second position in opposing relation to the upper surfaces of the conveyers 9 and 10. The carrier loader 34 includes first and second chucking stations 35 and 36 (FIG. 5), which will be discussed in greater detail hereinafter, and which are in opposing relation to the conveyers 9 and 10, respectively, when the carrier loader 34 is moved to its second position. The chucking stations 35 and 36 are used for transferring the carriers 1 between the conveyers 9 and 10 and the shift table 32, and accordingly, the chucking stations 35 and 36 include four suspension pawls 37 and 38, respectively, for engaging with the four suspension keepers or handles 4 of each carrier 1 to lift the carriers 1 from the conveyers 9 and 10 or the shift table 32.

The conveyer 9 transfers each carrier 1, prior to the assembly operation, to a position opposite assembly center 11, and at which carrier loader 34 is positioned as indicated by the solid lines in FIG. 5. The suspension pawls 37 of one chucking station 35 of the carrier loader 34 engage the keepers 4 on the carrier 1 to lift the carrier 1 from the conveyer 9. The carrier loader 34 then moves to the position shown in broken lines in FIG. 5 so as to move carrier 1 from a position over the conveyer 9 to a position over the moving table 31 in the assembly center 11. When shift table 32 is moved to the position shown in broken lines, that is, below chucking station 35, carrier 1 is released by the latter and lowered onto shift table 32. The movable table 31 is next moved in the X-axis direction and the Y-axis direction according to a predetermined control program or procedure while working heads of the working units 29 and 30 are vertically moved in synchronism with the movements of movable table 31 to perform the feeding, processing and assembly of the main parts 6 on each chassis 5 and any other associated operations. During these assembling and related operations, the carrier loader 34 is positioned above the conveyers 9 and 10, as indicated by the solid lines of FIG. 5, so as to avoid interference with movements of working units 29 and 30. After the assembly operations have been performed to assemble the parts 6 on each chassis 5, shift table 32 is moved to the position shown in full lines on FIG. 5, and carrier loader 34 is moved to the position shown in broken lines for disposing chucking station 36 above shift table 32 supporting the carrier 1 on which assembly operations have been performed, while a new carrier 1, on which assembly operations are to be performed, is suspended from pawls 37 of chucking station 35. The chucking station 36 then lifts the carrier on which assembly operations have been performed, and the empty shift table 32 is returned to the position shown in broken lines under chucking station 35 to receive from the latter the new carrier 1 on which assembly operations are to be performed.

Upon the return of carrier loader 34 to the position shown in full lines on FIG. 5, chucking station 36 is disposed above conveyer 10 and its pawls 38 are released to lower onto conveyer 10 the carrier 1 which assembly operations have been performed at assembly center or station 11. At the same time, another carrier 1 on which assembly operations are to be performed is engaged by pawls 37 of chucking station 35 and lifted from conveyer 9 in preparation for the next operating cycle at station 11.

It will be appreciated that the successive carriers 1 on which assembly operations are to be performed are brought to station 11 on conveyer 9, and, after performance of such assembly operations, each carrier 1 is transported away from station 11 on conveyer 10 to the next assembly center or station 12 where a similar cycle of operations is performed. However, at such station 12, the carriers 1 on which assembly operations are to be performed are drawn from conveyer 10 and thereafter returned to conveyer 9 for further transport to the last assembly center or station 13.

Figure 6A:
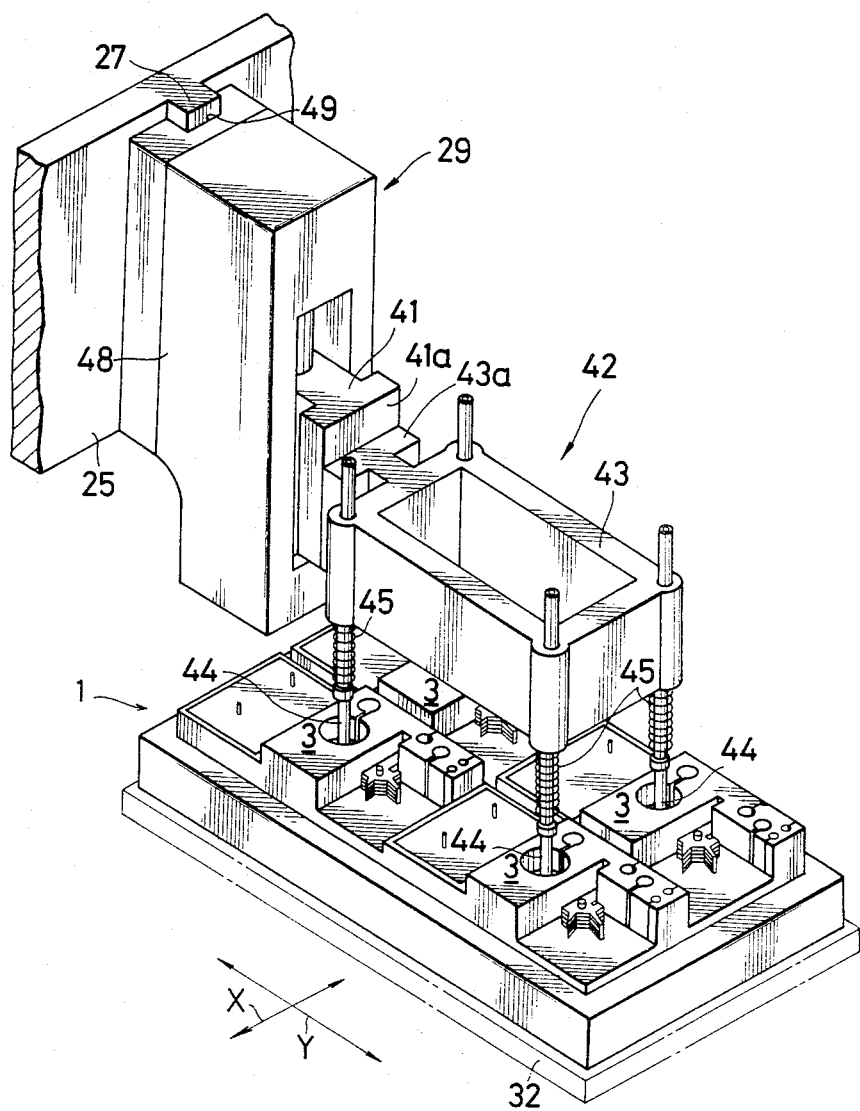
FIGS. 6A and 6B are perspective views illustrating an assembly operation on a carrier member by a working unit.
Figure 6B:
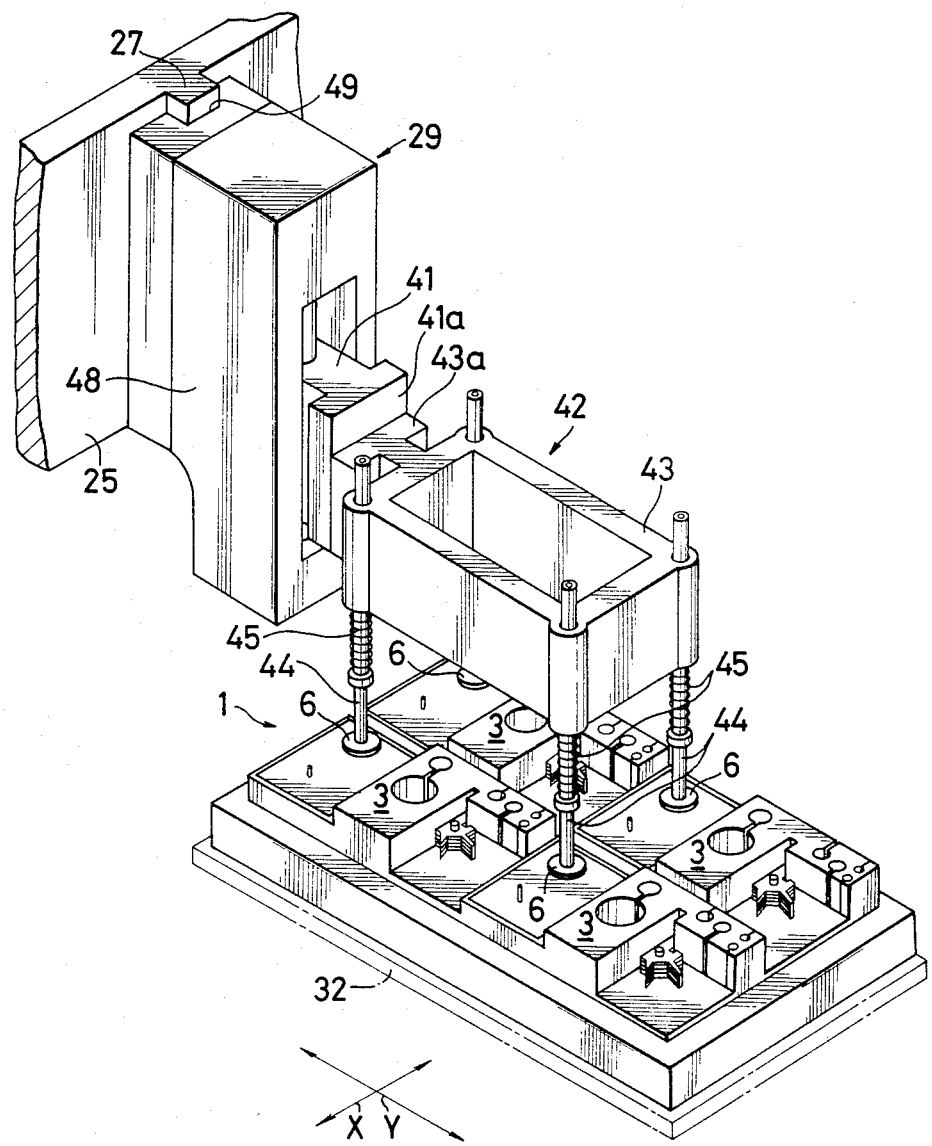

Reference will now be made to FIGS. 6A and 6B in explaining the nature of the work units 29, 30 that are provided at each of the assembly centers or stations 11, 12 and 13 for assembling parts 6 on each related chassis 5 and performing other associated operations. As shown in respect to work unit 29, a lift base 41 is vertically reciprocable relative to a mounting member 41a which is secured on a respective key 27 on plate 25.

A working head 42, which may be of various types, is mounted on a front surface of the lift base 41 so that the working head 42 may be interchanged. In the illustrative embodiment, head 42 includes a head holder 43 which has four chucking heads 44 extending downwardly therefrom. The four chucking heads 44 are positioned with a predetermined distance therebetween corresponding to the distances between corresponding locations on the four pallets 3 of the carrier 1. In an exemplary embodiment, the chucking heads 44 are connected to a vacuum pump (not shown) and can lift the main parts 6 by the suction of air through openings 44b formed in their lower end portions 44a. The chucking heads 44 are elastically urged downwardly relative to holder 43 by compression springs 45 mounted in surrounding relationship to chucking heads 44.

At each of the assembly centers 11, 12 and 13, when a carrier 1 is placed on the shift table 32 mounted on the respective movable table 31, such carrier 1 is movable in the X-axis and Y-axis directions shown on FIGS. 6A and 6B relative to chucking heads 44, by movement of the movable table 31 in the X-axis and Y-axis directions. Accordingly, the four chassis 5 and the corresponding parts 6 on the four pallets 3 of the carrier 1 are simultaneously positioned with respect to the four chucking heads 44 of the working head 42.

Figure 7A:
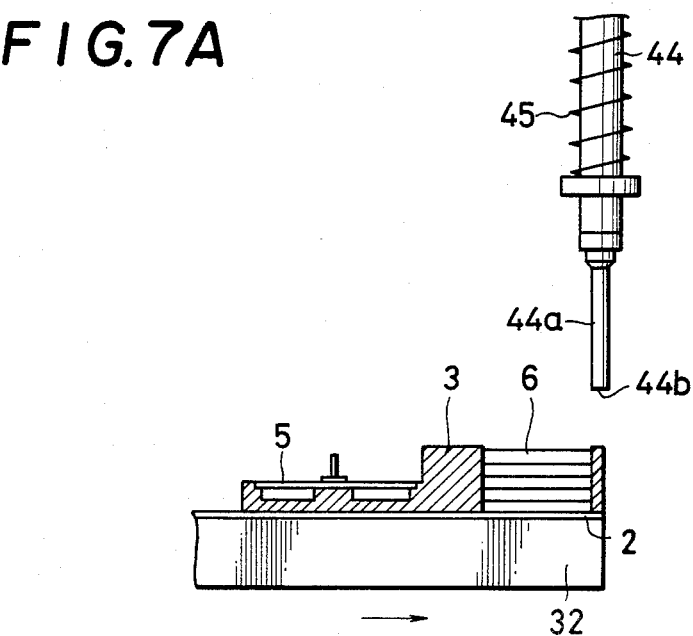
FIGS. 7A to 7G are side views illustrating the operation of the working heads and a movable table during an assembly operation.
Figure 7B:
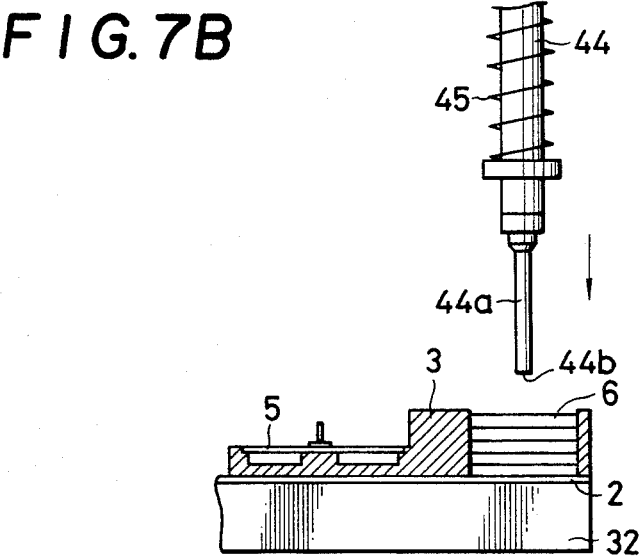
Figure 7C:
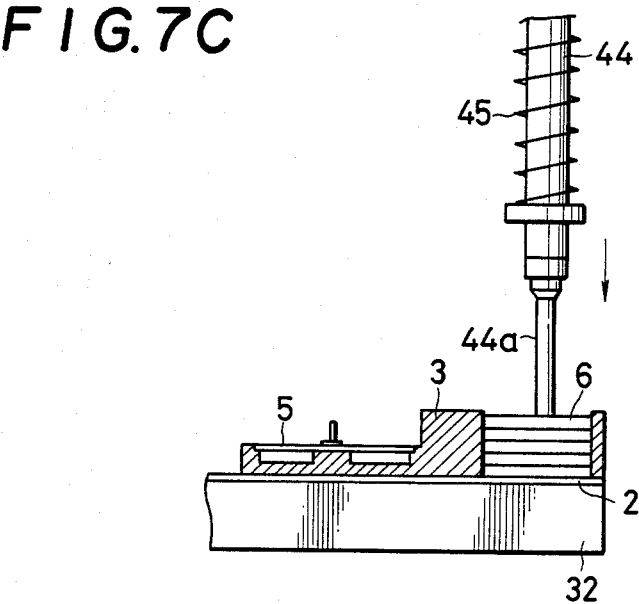
Figure 7D:
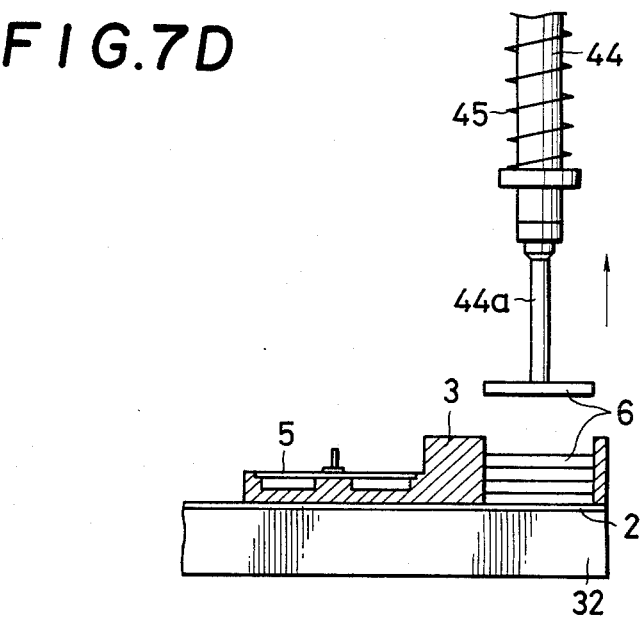

For example, by movement of carrier 1, each chucking head 44 is respectively positioned over a corresponding part 6 on the respective pallet 3 of the carrier 1, as shown on FIG. 7B. As illustrated in FIGS. 6A and 7C, downward movement of lift base 41 of working unit 29 then lowers the working head 42 so that the lower ends 44a of the chucking heads 44 are elastically urged by springs 45 against the respective parts 6. The suction draws the uppermost parts 6 in the stacks thereof to the lower ends 44a. As shown in FIG. 7D, each chucking head 44 of working head 42 subsequently lifts the respective part 6 in response to upward movement of the lift base 41.

Figure 7E:
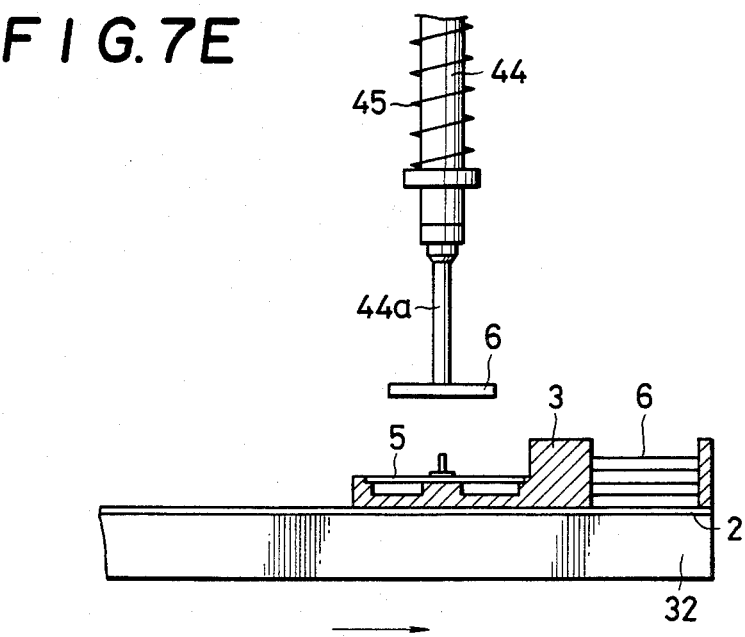

The positions of the chucking heads 44 in the X-axis and Y-axis directions with respect to the chassis 5 placed on the four pallets 3 of the carrier 1 are determined by further suitable movements of the movable table 31. Consequently, the chucking heads 44 are positioned at the assembled positions of the previously lifted parts 6 on the respective chassis 5, as shown in FIG. 7E.

Figure 7F:
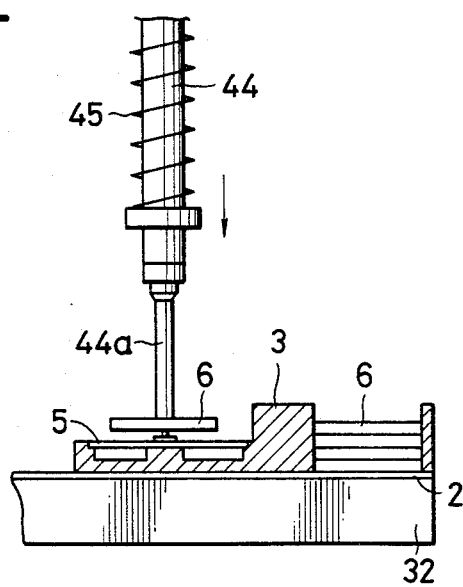
Figure 7G:
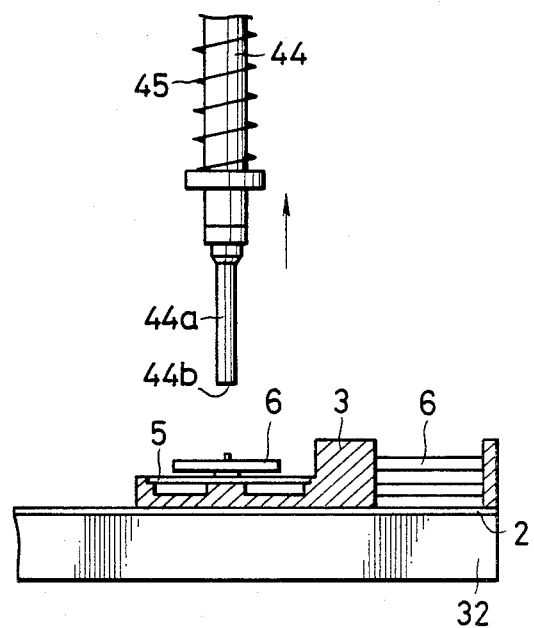

As shown in FIGS. 6B and 7F, the lift base 41 is moved downwardly and lowers the working head 42 whereby the parts 6 adhered by suction to the lower ends 44a of the chucking heads 44 are elastically urged to their assembled positions on the respective chassis 5 to be assembled thereon. Then, the suction applied to the chucking heads 44 is released so that the parts 6 are detached from the lower ends 44a of the chucking heads 44 and remain in this assembled position on chassis 5, as illustrated in FIG. 7G, when the lift base 41 lifts the working head 42 to its initial position where it is ready for the next assembly operation cycle.

A suitably programmed computer or microprocessor can be utilized to conventionally control pneumatically or otherwise powered movements of the movable table 31 in the X-axis and Y-axis directions, vertical movements of working head 42, and the movements of carrier loader 34 during the assembly of the parts 6 on each chassis 5. In such case, changes in the design or type of articles to be assembled are easily accommodated by rewriting and storing a control program in the computer. In the event of such changes, the parts feeding units, the assembly jigs and the like at the assembly stations or centers 11, 12 and 13 need not be modified. An automatic assembling machine is thus made very flexible and can serve for many different assembling operations if the parts to be assembled are carried thereto in accordance with the present invention.

In addition to the working unit 29 described hereinbefore, other working units can be incorporated at the respective assembly centers 11, 12 and 13 for performing, for example, the tightening of screws, the mounting of polygrips and polywashers, the lubrication of parts, the magnetization of magnetic members, and the assembly and processing of other commonly used parts, and the like. These operations can be performed in association with control of the movement of the movable table 31 in the X-axis and Y-axis directions as hereinbefore described.

The number of feeding units and assembly jigs for the parts 6 at the assembly centers 11, 12 and 13 can be significantly reduced since each chassis 5 and the parts 6 to be assembled thereon are fed onto a carrier 1 and then transferred to the assembly centers 11, 12 and 13 where the predetermined assembly operations are performed.

Since each chassis 5 and the respective parts 6 are positioned on the carrier 1, the movable table 31 at each of the assembly centers 11, 12 and 13 need only control the horizontal movement of the carrier 1 in the X-axis and Y-axis directions. Many kinds of parts 6 can be efficiently mounted on the chassis 5 since only simple vertical movements of the working heads 42 of the working units 29 and 30 are required, and the vertical movements of the working heads 42 can be easily controlled by a suitably programmed computer or microprocessor.

The standard working unit 29 will now be described with reference to FIGS. 6A, 6B and 8. The working unit 29 is detachably mounted through a predetermined key 27, 28 on one of the working unit mounting plates 25, 26. In the illustrative embodiment, the key comprises a raised ridge which cooperates with a groove 49 formed in the rear-end face of unit housing 48. The working unit 29 is detachably secured to the mounting plate 25 by mounting bolts 50.

The lift base 41 is vertically reciprocable within aperture 52 in the front of the unit housing 48 and is attached to vertically disposed guide shafts 51 arranged inside the front end portion of the unit housing 48. A mounting plate 41a is integrally formed at the front end side of the lift base 41. A mounting plate 43a integrally formed with the rear-end of head holder 43 is secured to lift base 41 by mounting bolts 65. Mounting plate 43a is coupled to the mounting plate 41a by a key fitting mechanism (not shown) so that the mounting plate 43a assumes the position illustrated in FIG. 8 with respect to the mounting plate 41a.

The mechanism for providing the vertical reciprocal motion of the working head 42 is now to be described. A cam 53 is rotatably mounted on a cam shaft 54 positioned within the unit housing 48. A cam follower roller 55 is secured to a cam follower lever 56 and engages the edge of cam 53 from above. One end of cam follower lever 56 is pivoted on a horizontal shaft 57. The other end of the cam follower lever 56 is coupled to the lift base 41 through an elongate hole 58 formed in the cam follower lever 56 engaging a pin 59 secured to the lift base 41. A motor 60 mounted on the unit housing 48 turns a drive shaft 62 through a timing belt 61. A worm 63 attached to the drive shaft 62 meshes with a worm wheel 64 secured to cam shaft 54 for rotation of rotary cam 53.

In operation, the motor 60 turns the drive shaft 62 and thereby the worm 63 through the timing belt 61. The worm 63 engages the worm wheel 64 secured to the cam shaft 54 and turns the rotary cam 53. The rotary cam 53 engages the cam follower roller 55 to impart vertical reciprocal motion to the cam follower lever 56 and, thereby, to the working head 42. As will be evident to those of skill in the art, the working head 42 moves in uniform vertical reciprocal strokes.

Figure 9:
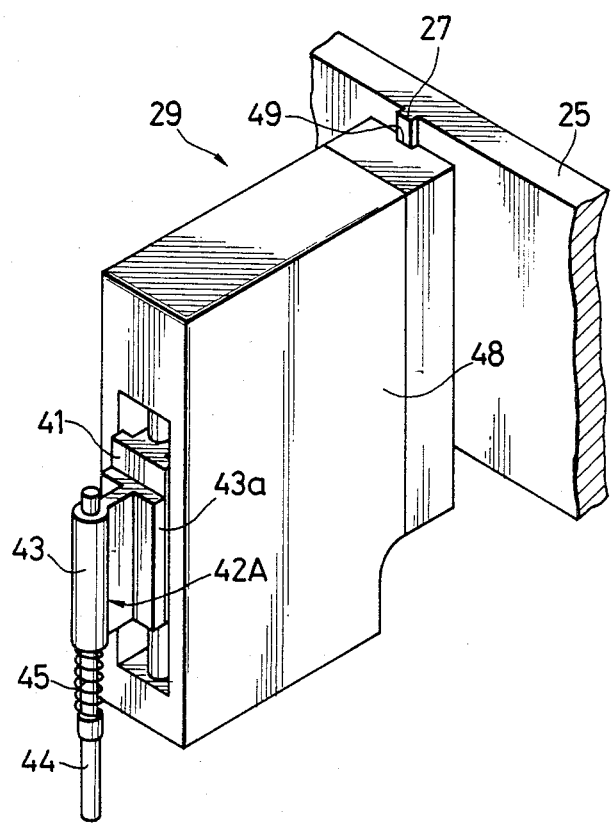
FIGS. 9 to 10 are perspective views of two different kinds of working units.

In FIG. 9, the working unit 29 has thereon a working head 42A with only a single chucking head 44 attached to the lift base 41. The single head unit can be freely substituted for the four head unit depicted in FIGS. 6A and 6B. One example of a working unit 29 having a single head is a transfer unit.

Figure 10:
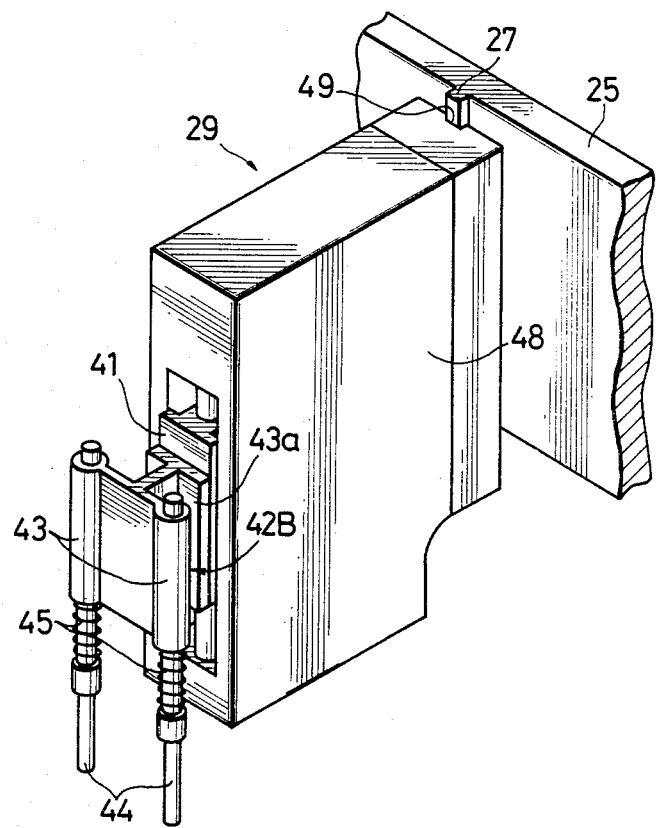

The working unit 29 of FIG. 10 has thereon a working head 42B with two chucking heads 44 attached thereto, forming a double head unit. Just as in the embodiment of FIG. 9, the double head unit of FIG. 10 can be substituted for the four head unit of FIGS. 6A and 6B.

Figure 11:
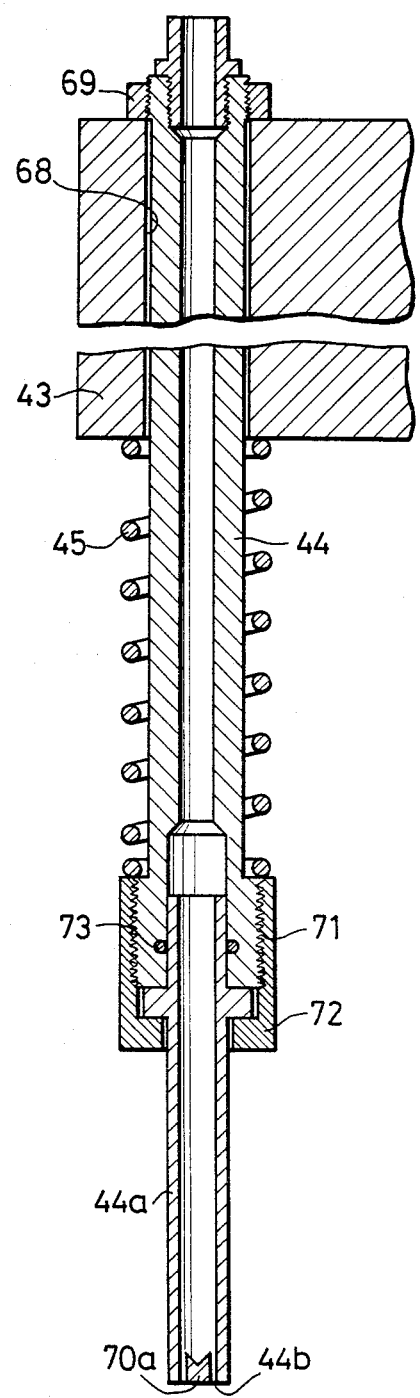
FIG. 11 is a cross sectional view of a chucking head used in the assembly center of FIG. 3.

In FIG. 11, the chucking head 44 of the working unit 29 is vertically movable through a head holding hole 68 formed in the head holder 43. The chucking head 44 is biased downwardly by the compression spring 45. A stopper 69 attached to the chucking head 44 limits the downward movement of the chucking head 44 by contacting the upper surface of the head holder 43. The lower end portion 44a of the chucking head 44 comprises a tool which includes a suction surface 70a. The tool 44a is detachably secured by a lock cylinder 72 which screws onto a threaded portion 71 formed on the outer circumference of the lower end of the chucking head 44. An O-ring 73 positioned in a groove formed in the chucking head 44 provides an airtight seal between the lower end of the chucking head 44 and the tool 44a.

In one embodiment, the chucking heads 44 are vacuum chucks and all have the same suction surfaces 70a so that the chucking heads 44 can be used for different kinds of parts 6. The tool 44a can be changed to accommodate different kinds of parts 6 when the standard chucking head 44a is not appropriate for the part to be assembled.

Figure 12:
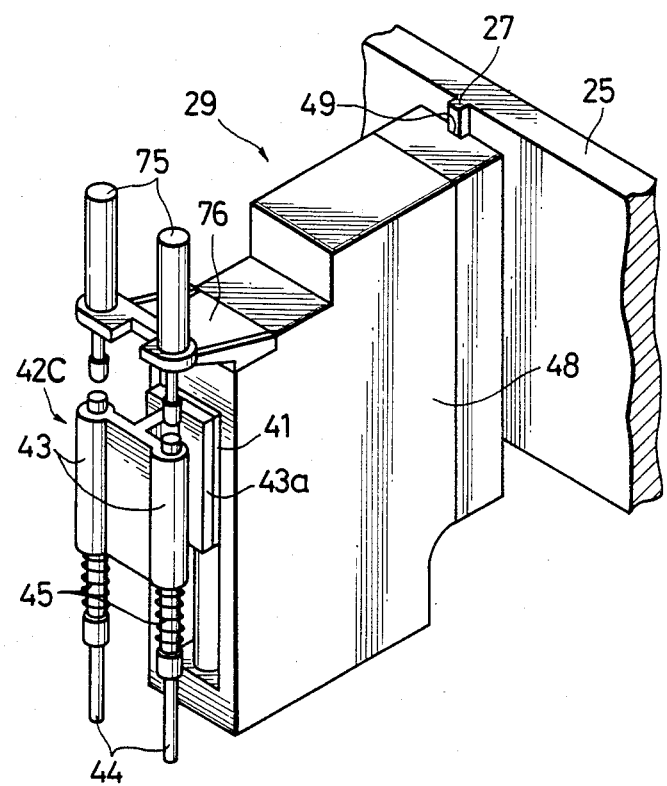
FIGS. 12 to 14 are further perspective views of working units used in accord with the present invention.

In FIG. 12, the working unit 29 is illustrated with a transfer forcing unit 42C attached which includes a forcing cylinder 75 detachably mounted to an upper end of the unit housing 48 by a holder 76 for each chucking head 44. After the parts 6 are transferred on the chassis 5, the forcing cylinders 75 press the upper ends of the chucking heads 44 to secure the parts 6 on the chassis 5. The structure and function of the head holder 43 and the chucking heads 44 are substantially the same as described before.

Figure 13:
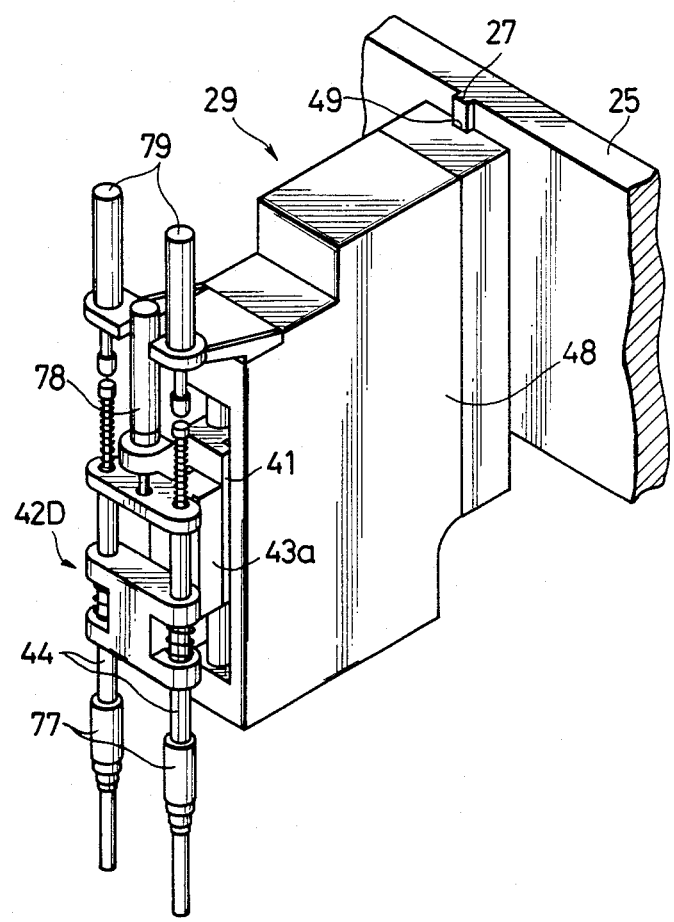

In FIG. 13, the working unit 29 is shown to have attached thereto a working head 42D which comprises tool exchange heads 77 attached to lower ends of the chucking heads 44, an automatic tool clamping cylinder 78, and a pair of automatic tool detaching cylinders 79. The cylinders 78,79 automatically operate the tool exchange heads 77 to change the tools attached to the chucking heads 44 during the assembly of the parts 6 on the chassis 5.

Figure 14:
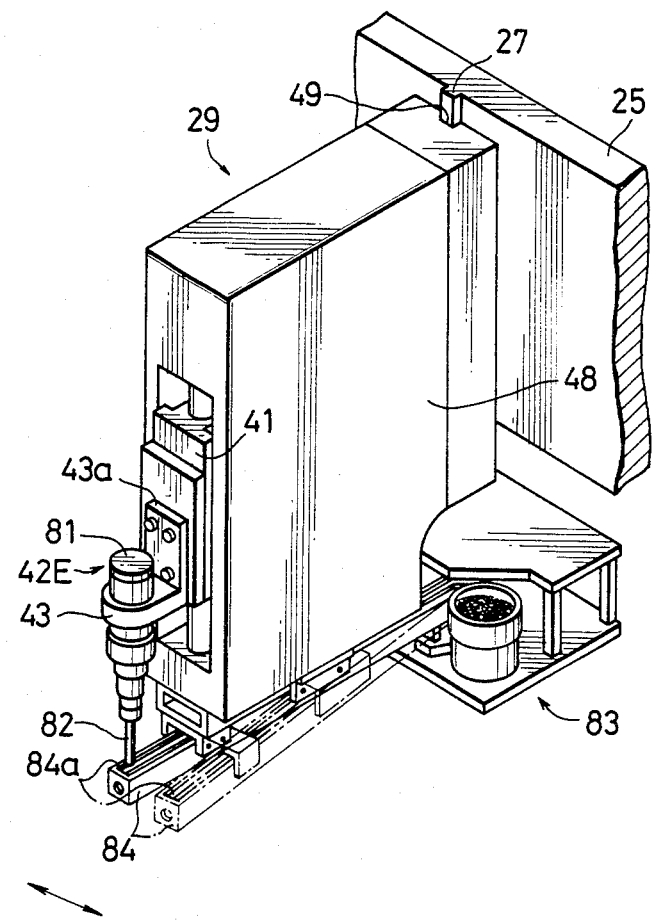

The working unit 29 of FIG. 14 is shown to have a working head 42E which constitutes a screw tightening unit with an automatic driver 81 attached to the head holder 43. The automatic driver 81 can be pneumatically or electrically operated, and has a screw chucking head 82 mounted on its lower end. An automatic screw feeding unit 83 is mounted on the unit housing 48 and includes a screw feeding chute 84. The screw feeding chute 84 is transversely pivoted in synchronism with movements of the automatic driver 81 sequentially to feed screws to the front end 84a of the screw feeding chute 84 where they are picked up by the screw chucking head 82 and fastened to the chassis 5.

Figure 15C:
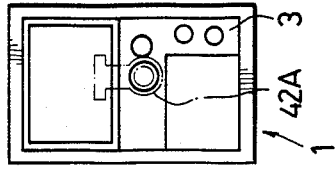
FIGS. 15A to 15C are plan views illustrating the placement of the working units in an assembly center according to the number of sets of parts positioned on the carrier member.
Figure 15B:
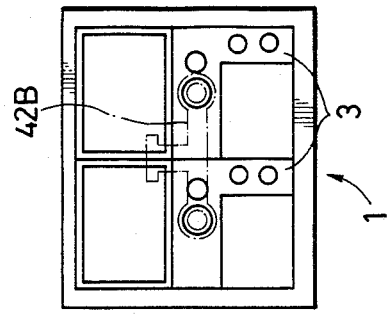
Figure 15A:
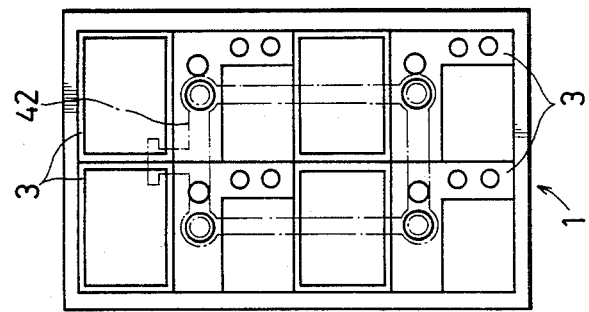

The working heads 42, 42B, 42C, 42D and 42E can be easily interchanged among the working units 29 whenever there is a change in the design or type of equipment to be manufactured. Only the working heads 42 to 42E need to be changed when such changes are to be made. In FIG. 15A, the carrier 1 has four pallets 3 with four sets of parts positioned thereon and, accordingly, the working head 42 used in the assembly operation has four chucking heads 44. In FIG. 15B, two sets of parts are positioned on the pallets 3 of the carrier 1, so a working head 42B with two chucking heads 44 is used in the assembly operation. In FIG. 15C, only a single set of parts is positioned on the carrier 1, and thus, only one chucking head 44 is used with the working head 42A. It is to be noted that the working head 42 is all that is changed to accommodate the three different carriers 1 used in the assembly operation. The automatic assembling machine does not need to be otherwise modified, unlike prior art devices, where the entire assembly needs to be changed.

Figure 16:
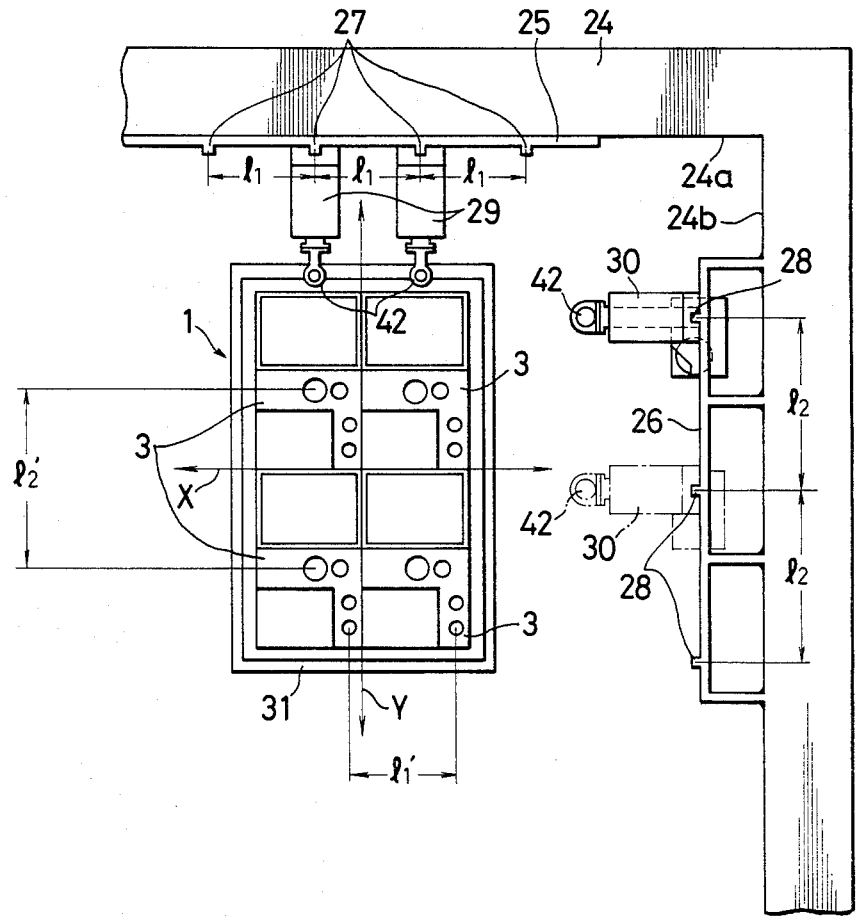
FIG. 16 is a partial, enlarged, plan view of an assembly center in accord with the present invention.

The assembly center of FIG. 16 includes working units 29, 30 of various kinds selectively mounted to the keys 27, 28, at predetermined positions on the working unit mounting plates 25, 26 attached to the working unit mounting member 24. In the illustrative embodiment, one mounting plate 25 is parallel to the direction of movement of the movable table 31 in the X-axis direction and the other mounting plate 26 is parallel to the Y-axis direction of the movable table 31. For the Y-axis direction, the working units 29, 30 can be positioned within the range of movement of the movable table 31 to minimize unnecessary motions by the movable table 31.

Since the carrier 1 can be transferred to the working units 29, 30 with a minimal amount of movement of the movable table 31 in the X-axis and Y-axis directions, movements of the movable table 31 can be reduced while a number of assembly operations by the working units 29 and 30 are performed. Accordingly, the assembly operation can be performed with high efficiency in a short time. Since the working unit mounting member 24 has a U-shape, the working units 29, 30 can be positioned thereon in a compact fashion, and not in a straight line as in prior devices, so the assembly centers 11, 12 and 13 can be of compact construction.

In the embodiment of FIG. 16, the keys 27 on the mounting plate 25 are positioned with a distance $l_1$ therebetween in the X-axis direction. The working units 29 mounted on the mounting plate 25 are used in the assembly of some of the corresponding parts 6 arranged on the pallets 3. According to the illustrated embodiment, corresponding parts 6 of the sets are arranged on the pallets 3 with a distance $l_1$ therebetween in the X-axis directions. Accordingly, if $l_1 = l_1'$ the carrier 1 can be positioned beneath the working heads 42 so that the corresponding parts 6 of the sets are positioned directly beneath the working heads 42. Vertical reciprocal motion of the working heads 42 then engages the chucking heads 44 with the corresponding parts 6 on the carrier 1 for easy assembly.

In a like fashion, the keys 28 on the mounting plate 26 are arranged at a distance $l_2$ therebetween in the Y-axis direction. The working units 30 attached to the keys 28 thus position the working heads 42 at a distance $l_2$ therebetween. Some of the corresponding parts 6 are arranged on the carrier 1 with a distance $l_2'$ therebetween in the Y-axis direction. If $l_2 = l_2'$, the carrier 1 can be positioned directly beneath the working heads 42 attached to the working units 30 whereby the chucking heads 44 can be lowered to engage the corresponding parts 6 on the carrier 1. According to the illustrative embodiment, pairs of corresponding parts can be simultaneously assembled on the chassis 5 positioned on the carrier 1 with a single movement of the movable table 23.

The distances $l_1$, $l_1'$ are chosen to be smaller than the distances $l_2$, $l_2'$ in a preferred embodiment. Such an arrangement can be advantageous since some of the working units 29 require greater distances therebetween than other working units 29. For example, screw tightening units are generally large in size because of related equipment, such as automatic screw feeding units 83 or screw feeding chutes 84. Since the screw tightening units are large, they cannot be positioned very close to each other in the assembly centers 11, 12 and 13. If the distances between the keys 28 are $l_2$, and the distance $l_2$ is selected so that two screw tightening units can be accommodated in the assembly centers 11, 12 and 13, two screws can be simultaneously tightened by the screw tightening units with a single movement of the carrier 1 in the Y-axis direction.

Although illustrative embodiments of the invention have been described in detail herein with reference to the accompanying drawings, it is to be understood that the invention is not limited to such precise embodiments, and that various further changes and modifications may be made by one skilled in the art without departing from the spirit or scope of the invention as defined in the appended claims.

What is claimed is:

1. An automatic assembling machine for use with a carrier having sets of parts thereon, with the parts in each of said sets being in a predefined positional relationship definable by predetermined distances therebetween in two orthogonal directions, and with corresponding parts in said sets being at first and second uniform distances from each other in said two orthogonal directions, respectively, said machine comprising:

movable table means for supporting said carrier and moving in said two orthogonal directions in a horizontal plane;

mounting surface means extending above said plane of said movable table means and having first and second mounting surface portions parallel to said two orthogonal directions, respectively, said first and second mounting surface portions each having a plurality of mounting points located at said first and second uniform distances, respectively, from each other in said two orthogonal directions; and a plurality of working unit means releasably attached, at said mounting points, to each of said first and second mounting surface portions so as to be positionally related to each other for cooperation with movements of said table means simultaneously to engage corresponding parts in said sets in each of said two orthogonal directions.

2. The automatic assembling machine of claim 1; and further comprising at least one chucking head extending from said working unit means for selectively engaging said parts during assembly.

3. The automatic assembling machine of claim 2; in which each said working unit means includes a vertically reciprocable working member having a head from which said chucking head extends.

4. The automatic assembling machine of claim 1; and further comprising conveying means for transferring said carrier to and from said movable table means.

5. The automatic assembling machine of claim 1; and further comprising mounting plate means for attaching said working unit means to said mounting surface means.

6. The automatic assembling machine of claim 5; in which said mounting plate means has key means for attaching said working unit means to said mounting plate means at said mounting points.

7. The automatic assembling machine of claim 6 in which said working unit means has a groove therein; and wherein said key means comprises a vertically extending ridge cooperatin

* * * * *